(12) United States Patent
Chen et al.

(10) Patent No.: US 11,979,928 B2
(45) Date of Patent: May 7, 2024

(54) HANDHELD ELECTRONIC DEVICE, DATA-TRANSMITTING METHOD THEREOF AND NON-TRANSITORY STORAGE DEVICE

(71) Applicant: GETAC HOLDINGS CORPORATION, Taoyuan (TW)

(72) Inventors: Hung-Xin Chen, Taipei (TW); Yu-Shian Chen, Taipei (TW)

(73) Assignee: Getac Holdings Corporation, Taoyuan (TW)

( * ) Notice: Subject to any disclaimer, the term of this patent is extended or adjusted under 35 U.S.C. 154(b) by 363 days.

(21) Appl. No.: 17/359,341

(22) Filed: Jun. 25, 2021

(65) Prior Publication Data
US 2022/0279608 A1    Sep. 1, 2022

(30) Foreign Application Priority Data
Feb. 26, 2021  (CN) .......................... 202110217274.6

(51) Int. Cl.
| | |
|---|---|
| *H04L 29/06* | (2006.01) |
| *H04W 12/06* | (2021.01) |
| *H04W 76/14* | (2018.01) |
| *G06V 40/20* | (2022.01) |

(52) U.S. Cl.
CPC ........... *H04W 76/14* (2018.02); *H04W 12/06* (2013.01); *G06V 40/20* (2022.01)

(58) Field of Classification Search
CPC ....... H04W 76/14; H04W 12/06; G06V 40/20
See application file for complete search history.

(56) References Cited

U.S. PATENT DOCUMENTS

| | | | |
|---|---|---|---|
| 2014/0038526 A1* | 2/2014 | Ennis ...................... | H04W 4/70 455/41.2 |
| 2018/0353094 A1* | 12/2018 | Cromwell ............ | A61B 5/7221 |
| 2022/0236942 A1* | 7/2022 | Wu ........................ | H04W 4/029 |

* cited by examiner

*Primary Examiner* — Evans Desrosiers
(74) *Attorney, Agent, or Firm* — Cooper Legal Group, LLC

(57) ABSTRACT

A data-transmitting method of a handheld electronic device includes: detecting movement of a first handheld electronic device to generate a first motion data; receiving a broadcast signal, wherein the broadcast signal carries a source device data and a second motion data; comparing the first motion data with the second motion data; establishing a communication link to a second handheld electronic device according to the source device data when the first motion data matches the second motion data; and receiving a specific data from the second handheld electronic device or sending the specific data to the second handheld electronic device.

12 Claims, 14 Drawing Sheets

HANDHELD ELECTRONIC DEVICE, DATA-TRANSMITTING METHOD THEREOF AND NON-TRANSITORY STORAGE DEVICE

BACKGROUND OF THE INVENTION

Field of the Invention

The present disclosure relates to information storage technology and, more particularly, to a handheld electronic device, a data-transmitting method thereof and a non-transitory storage device.

Description of the Prior Art

Data-retrieving devices retrieve medium data, such as images and sounds, at any time from the surroundings. The data-retrieving devices are so easy to use and effective in retrieving data instantly that they can function as security-enhancing devices and thus be widely used in various fields in response to ever-increasing security awareness among the public. For instance, motorcycle riders wear data-retrieving devices to record their journey, whereas law enforcement officers wear data-retrieving devices while on duty. Furthermore, medium data retrieved with the data-retrieving devices serve as evidence in any future legal proceedings.

Prior to their operation, the data-retrieving devices must be configured with user-related information, such as user personal data and duty-related data, in order to generate and/or back up medium data. Conventionally, the data-retrieving devices are manipulated by users or administrators by hand in order to be connected to a server or host and then configured by means of a specific operating interface provided by the server or host. The aforesaid configuration process is time-consuming and inconvenient. Furthermore, the users or administrators need to have a fairly good understanding of the operating interface before carrying out the aforesaid configuration process. In addition, it is time-consuming for an administrator to configure data-retrieving devices on behalf of users and then for the users to look for dedicated data-retrieving devices (i.e., the configured data-retrieving devices) in a cabinet, let alone easy for the users to choose a wrong dedicated data-retrieving device.

SUMMARY OF THE INVENTION

In an embodiment, a data-transmitting method of a handheld electronic device, comprising the steps of: detecting movement of a first handheld electronic device to generate a first motion data; receiving a broadcast signal carrying a source device data and a second motion data; comparing the first motion data with the second motion data; establishing a communication link to a second handheld electronic device according to the source device data when the first motion data matches the second motion data; and receiving a specific data from the second handheld electronic device and/or sending a request for the specific data to the second handheld electronic device, via the communication link.

In an embodiment, a handheld electronic device comprises a movement sensor, processing circuit, storage unit, and wireless module. The movement sensor generates a plurality of time-dependent original inertia data. The processing circuit is coupled to the movement sensor and adapted to perform computation on a plurality of original inertia data, so as to generate a first motion data. The storage unit stores the first motion data. The wireless module receives a broadcast signal. The broadcast signal carries a source device data and a second motion data. The processing circuit further compares the first motion data with the second motion data. When the first motion data matches the second motion data, the processing circuit uses the wireless module to establish a communication link to another handheld electronic device according to the source device data so as to receive a specific data from another handheld electronic device and/or send a request for the specific data to another handheld electronic device, via the communication link.

A non-transitory storage device stores commands executable to enable a handheld electronic device to: detect movement of the first handheld electronic device to generate a first motion data; receive a broadcast signal carrying a source device data and a second motion data; compare the first motion data with the second motion data; establish a communication link to a second handheld electronic device according to the source device data when the first motion data matches the second motion data; and receive a specific data from the second handheld electronic device and/or send a request for the specific data to the second handheld electronic device, via the communication link.

Therefore, the handheld electronic device, data-transmitting method thereof and non-transitory storage device in any one of the aforesaid embodiments allow a user to perform authentication of two handheld electronic devices by means of physical motion, such that the two authenticated handheld electronic devices automatically receive and send the specific data.

DETAILED DESCRIPTION OF THE EMBODIMENTS

Figure 1:
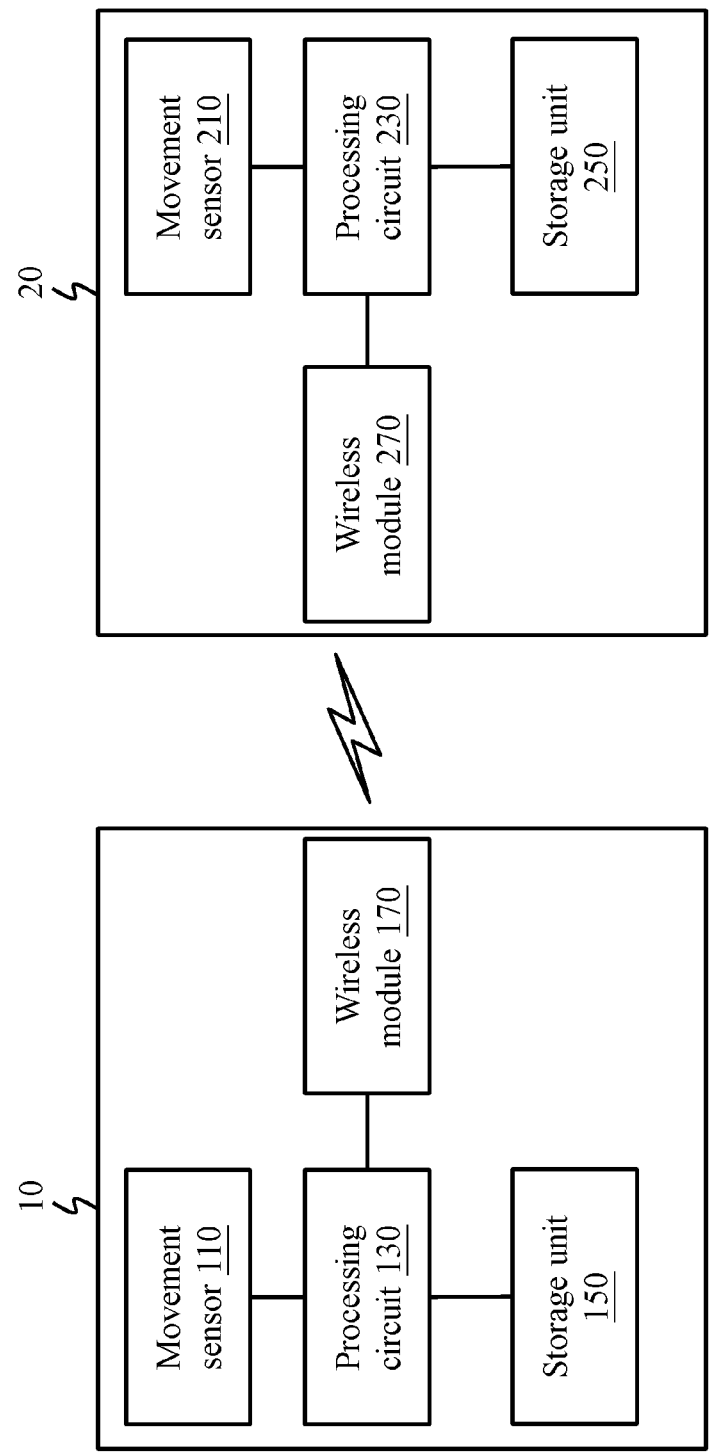
FIG. 1 is a block diagram of a handheld electronic device according to the first embodiment of the present disclosure.

Referring to FIG. 1, a handheld electronic device (hereinafter referred to as the first handheld electronic device 10)

comprises a movement sensor 110, a processing circuit 130, a storage unit 150 and a wireless module 170. The processing circuit 130 is coupled to the movement sensor 110, storage unit 150 and wireless module 170.

The first handheld electronic device 10 communicates with another handheld electronic device (hereinafter referred to as the second handheld electronic device 20). The second handheld electronic device 20 comprises a movement sensor 210, processing circuit 230, storage unit 250 and wireless module 270. The processing circuit 230 is coupled to the movement sensor 210, storage unit 250 and wireless module 270. The storage unit 250 stores a specific data.

Figure 2:
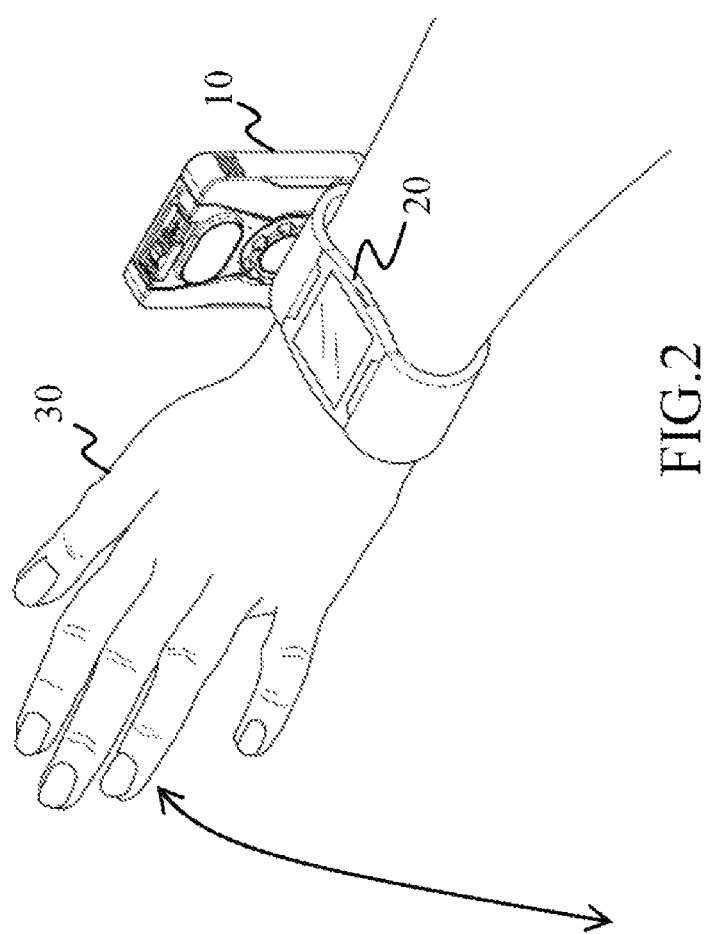
FIG. 2 is a schematic view of the handheld electronic device of FIG. 1.

In some embodiments, as shown in FIG. 1, to communicate with another handheld electronic device (hereinafter referred to as the second handheld electronic device 20), the first handheld electronic device 10 approaches the second handheld electronic device 20. Thus, the first handheld electronic device 10 and the second handheld electronic device 20 are not only located within signal coverage of the wireless modules 170, 270 but also undergo substantially identical reciprocating motion within a time period, as shown in FIG. 2. For instance, if the first handheld electronic device 10 is a body worn camcorder, and the second handheld electronic device 20 a smartwatch, a user 30 can attach the body worn camcorder to the smartwatch and swing them for a time period simultaneously, up and down, back and forth.

Figure 3:
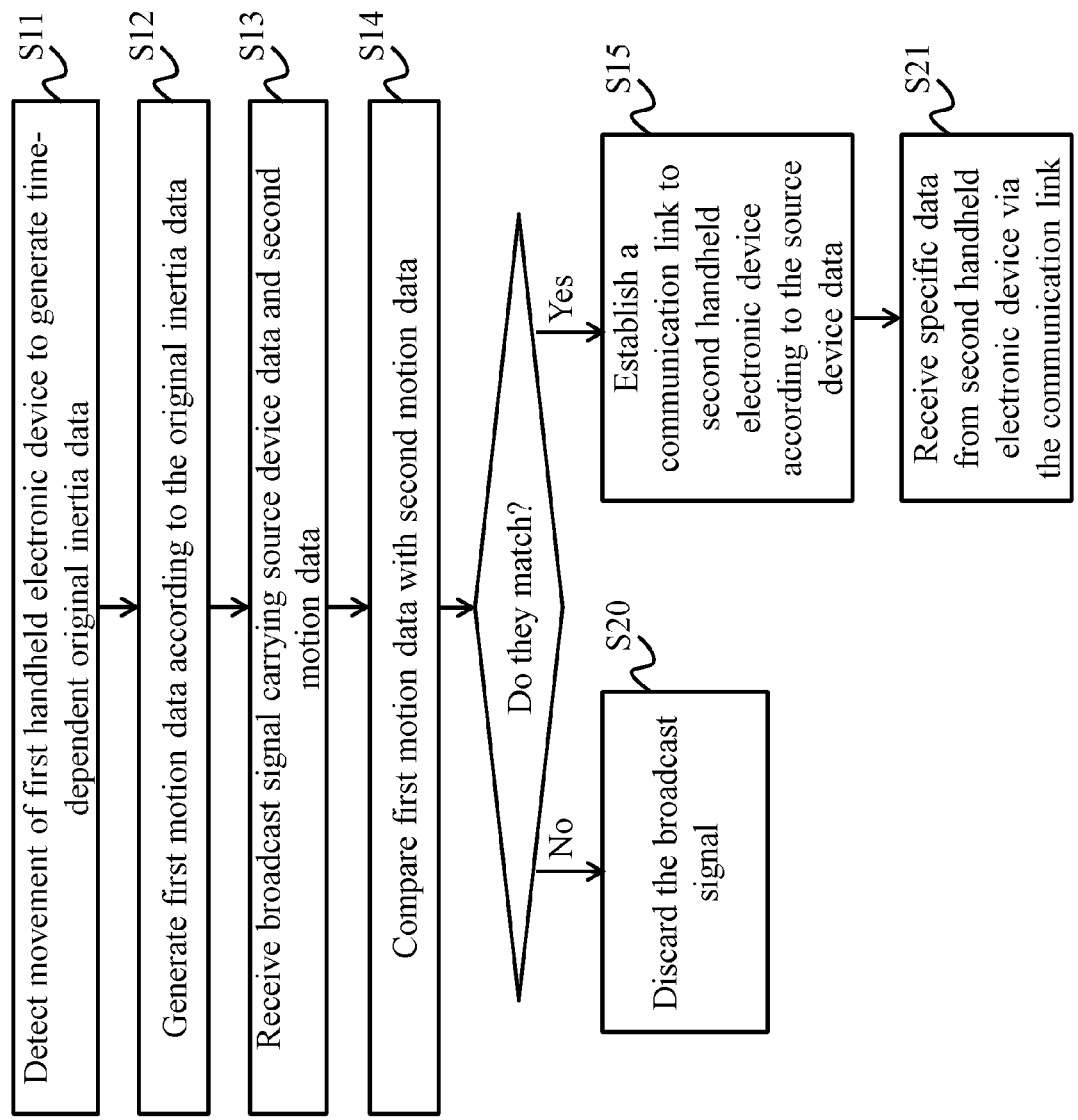
FIG. 3 and FIG. 4 are flowcharts of a data-transmitting method of the handheld electronic device of the first embodiment of the present disclosure.

Referring to FIG. 1 and FIG. 3, the movement sensor 110 senses the movement of the first handheld electronic device 10 within the time period to generate a plurality of original inertia data (hereinafter referred to as the first original inertia data) (step S11). The first original inertia data vary with time because of the movement of the first handheld electronic device 10. Then, the processing circuit 130 performs computation on the first original inertia data to generate motion data (hereinafter referred to as the first motion data) (step S12) and stores the generated first motion data in the storage unit 150. In an example, at each unit time point within the time period, the movement sensor 110 generates the original inertia data corresponding to the current position of the first handheld electronic device 10. Therefore, the processing circuit 130 generates, according to the original inertia data, the first motion data indicative of changes in the position of the first handheld electronic device 10 within the time period. In another example, at each unit time point within the time period, the movement sensor 110 generates the original inertia data corresponding to the current speed of the first handheld electronic device 10. Therefore, the processing circuit 130 generates, according to the original inertia data, the first motion data indicatives of changes in the speed of the first handheld electronic device 10 within the time period. In another example, at each unit time point within the time period, the movement sensor 110 generates the original inertia data corresponding to the current movement direction of the first handheld electronic device 10. Therefore, the processing circuit 130 generates, according to the original inertia data, the first motion data indicative of changes in the direction of the first handheld electronic device 10 within the time period.

Figure 4:
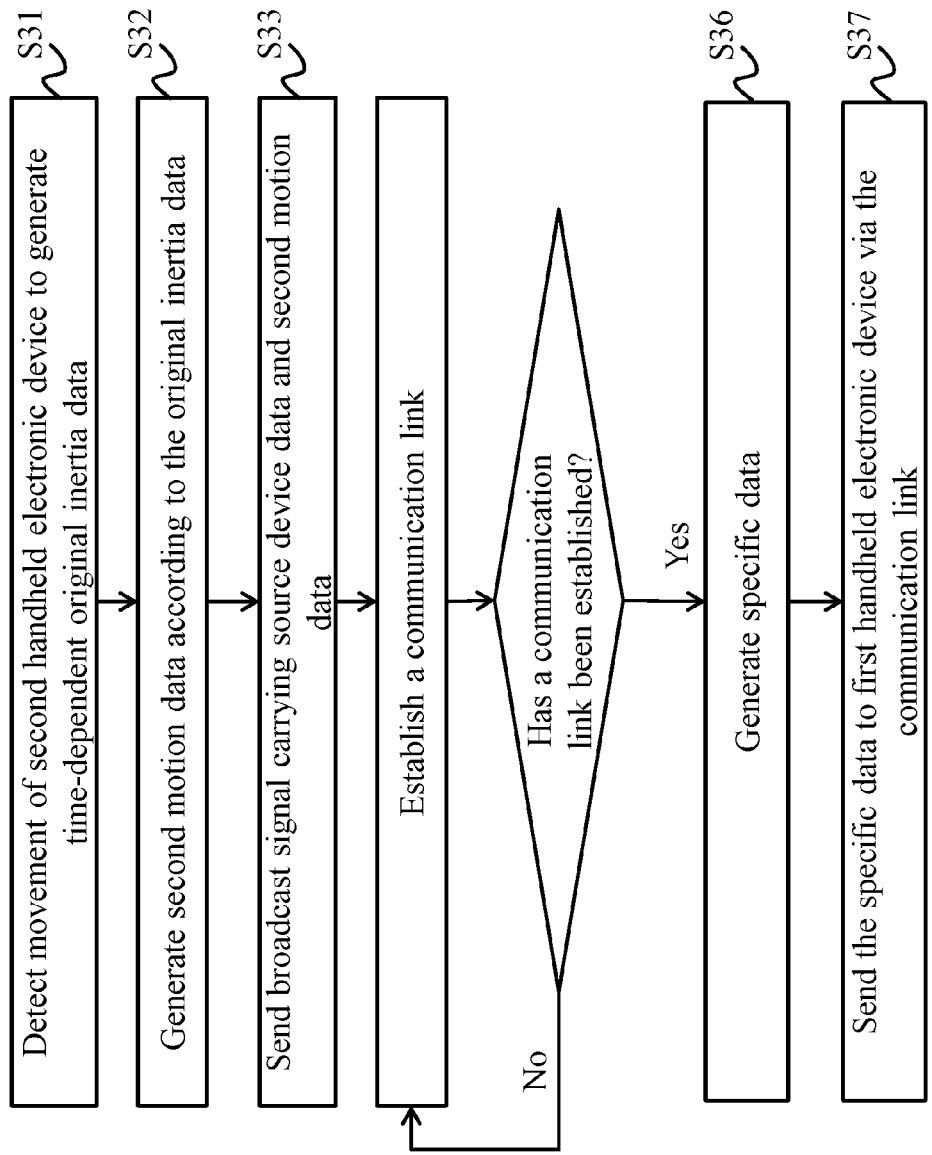

Referring to FIG. 1 and FIG. 4, within the time period, the movement sensor 210 detects the movement of the second handheld electronic device 20 to generate a plurality of time-dependent original inertia data (hereinafter referred to as the second original inertia data) (step S31). Then, the processing circuit 230 performs computation on the second original inertia data to generate motion data (hereinafter referred to as the second motion data) (step S32) and uses the wireless module 270 to send a broadcast signal (broadcast) carrying the second motion data (step S33). In addition to the second motion data, the broadcast signal sent by the wireless module 170 carries source device data (for example, Bluetooth address of the second handheld electronic device 20) which indicates that the broadcast signal originates from the second handheld electronic device 20. The broadcast signal is time sequence data.

In an embodiment, the first motion data and the second motion data are time sequence data. For instance, the first motion data is a data stream composed, according to a time dimension index, of the plurality of first original inertia data generated by the movement sensor 110 within the time period, and the second motion data is a data stream composed, according to a time dimension index, of the plurality of second original inertia data generated by the movement sensor 210 within the time period. Therefore, the first motion data corresponds to inertia changes in the movement of the first handheld electronic device 10 within the time period, whereas the second motion data corresponds to inertia changes in the movement of the second handheld electronic device 20 within the time period.

When the wireless module 170 receives the broadcast signal (step S13), the processing circuit 130 retrieves the second motion data from the broadcast signal and compares the first motion data with the second motion data (step S14) to confirm whether the two data match. The confirmation that the two data match can be made, provided that the two data are identical or the two data differ by a predetermined percentage or less (for example, 1%, 2%, 3%, 4% or 5%).

When the first motion data matches the second motion data, the processing circuit 130 uses the wireless module 170 to establish a communication link to the second handheld electronic device 20 according to the source device data (step S15). Therefore, the processing circuit 130 finds the second handheld electronic device 20 according to the source device data and establishes a communication link to the second handheld electronic device 20. For instance, the processing circuit 130 uses the wireless module 170 to find the wireless module 270 of the second handheld electronic device 20 according to the source device data and sends a connection request to the wireless module 270. When the wireless module 270 gives a connection permit, the wireless module 170 confirms the feasibility of connection according to the connection permit, such that a wireless communication channel for transmitting data is formed between the wireless module 170 and the wireless module 270.

After the communication link has been established, the processing circuit 130 receives a specific data from the second handheld electronic device 20 through the communication link (step S21). Therefore, upon establishment of communication (i.e., after step S15), the processing circuit 230 generates the specific data (step S36), i.e., reads out the specific data from the storage device 250, and sends the specific data thus read out to the first handheld electronic device 10 through the established communication link (step S37), i.e., uses the wireless module 170 to send the specific data to the wireless module 270. Therefore, the processing circuit 130 can use the wireless module 170 to receive the specific data sent via the communication link (i.e., step S21).

When the first motion data does not match the second motion data, the processing circuit 130 uses the wireless module 170 to discard the broadcast signal (step S20), i.e., not to perform the process of establishing a communication link. The confirmation that the two data do not match can be made in any one of the following scenarios: the two data are not identical; the two data differ by a predetermined percentage or more (for example, 1%, 2%, 3%, 4% or 5%); and one of the two data does not exist (for example, the broadcast signal does not carry the second motion data.)

Figure 5:
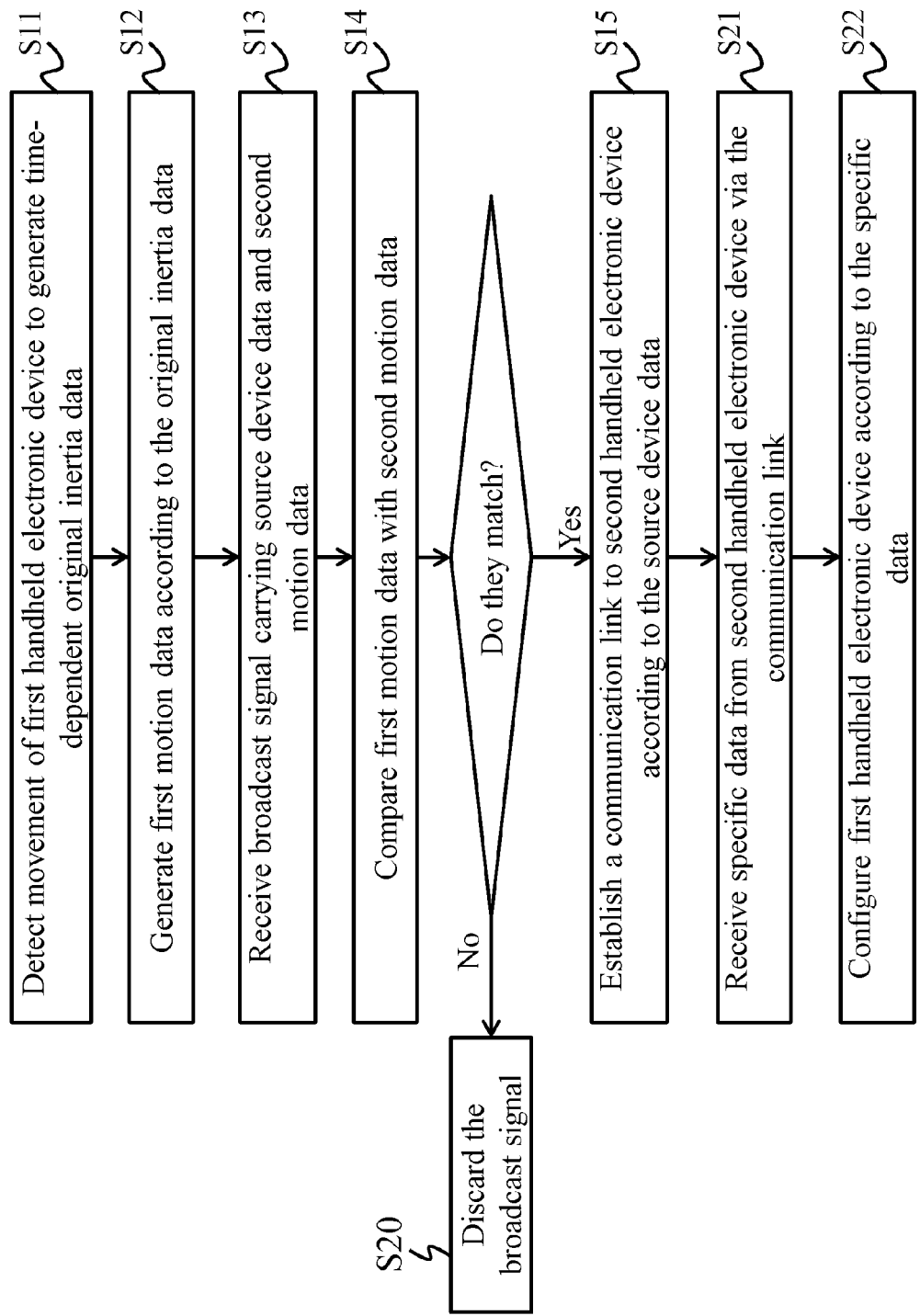
FIG. 5 is a flowchart of the data-transmitting method of the handheld electronic device according to the second embodiment of the present disclosure.

In some embodiments, the specific data is a device configuring data. Referring to FIG. 1 and FIG. 5, after the first handheld electronic device 10 has received the specific data (step S21), the processing circuit 130 automatically configures the first handheld electronic device 10 according to the specific data (step S22).

In an example, the specific data comprises a configuration command and at least one configuration value. After the first handheld electronic device 10 has received the specific data, the processing circuit 130 automatically executes, in response to the configuration command, a configuration process of an item corresponding to at least one configuration value, so as to configure the corresponding items of the first handheld electronic device 10 according to the configuration values, respectively.

In another example, the specific data comprises at least one authentication parameter. After the first handheld electronic device 10 has received the specific data, the processing circuit 130 automatically executes an identity authentication process with the at least one authentication parameter to confirm whether the second handheld electronic device 20 is authorized to connect to. In some embodiments, the at least one authentication parameter is adapted to perform permit authentication for accessing the first handheld electronic device 10 and provided by the second handheld electronic device 20 to the first handheld electronic device 10 to confirm whether it is authorized to access. For instance, the authentication parameter includes a username and a password. When the first handheld electronic device 10 receives the specific data, the processing circuit 130 automatically executes an identity authentication process. During the identity authentication process, the processing circuit 130 compares the password and the username in the specific data with authorized usernames and permit passwords thereof in a built-in authorized identity table. When the username is identical to an authorized username, and the password to a permit password of the authorized username, the processing circuit 130 determines that the identity authentication passes and allows establishment of a communication link (i.e., keeps the communication link established in step S15.) Therefore, the second handheld electronic device 20 can access the first handheld electronic device 10 via the communication link. Conversely, when the username is different from an authorized username, and/or the password from a permit password of the authorized username, the processing circuit 130 determines that the identity authentication fails and disallows establishment of a communication link (i.e., severs the communication link established in step S15.)

In yet another example, the specific data comprises a configuration parameter. The configuration parameter is adapted to set a configuration of the first handheld electronic device 10. After the first handheld electronic device 10 has received the specific data, the processing circuit 130 automatically executes a configuration setting process with the configuration parameter in the specific data, thereby setting a configuration of the first handheld electronic device 10 with the configuration parameter.

In still yet another example, the specific data comprises at least one authentication parameter and a configuration parameter. The at least one authentication parameter is adapted to perform permit authentication in order to access the first handheld electronic device 10. The configuration parameter is adapted to set a configuration of the first handheld electronic device 10. After the first handheld electronic device 10 has received the specific data, the processing circuit 130 automatically executes an identity authentication process with the at least one authentication parameter to confirm whether the second handheld electronic device 20 is authorized to connect to. After the processing circuit 130 has confirmed that the second handheld electronic device 20 is authorized to connect to according to the at least one authentication parameter, the processing circuit 130 automatically executes a configuration setting process with the configuration parameter in the specific data, thereby setting the configuration of the first handheld electronic device 10 with the configuration parameter.

Figure 6:
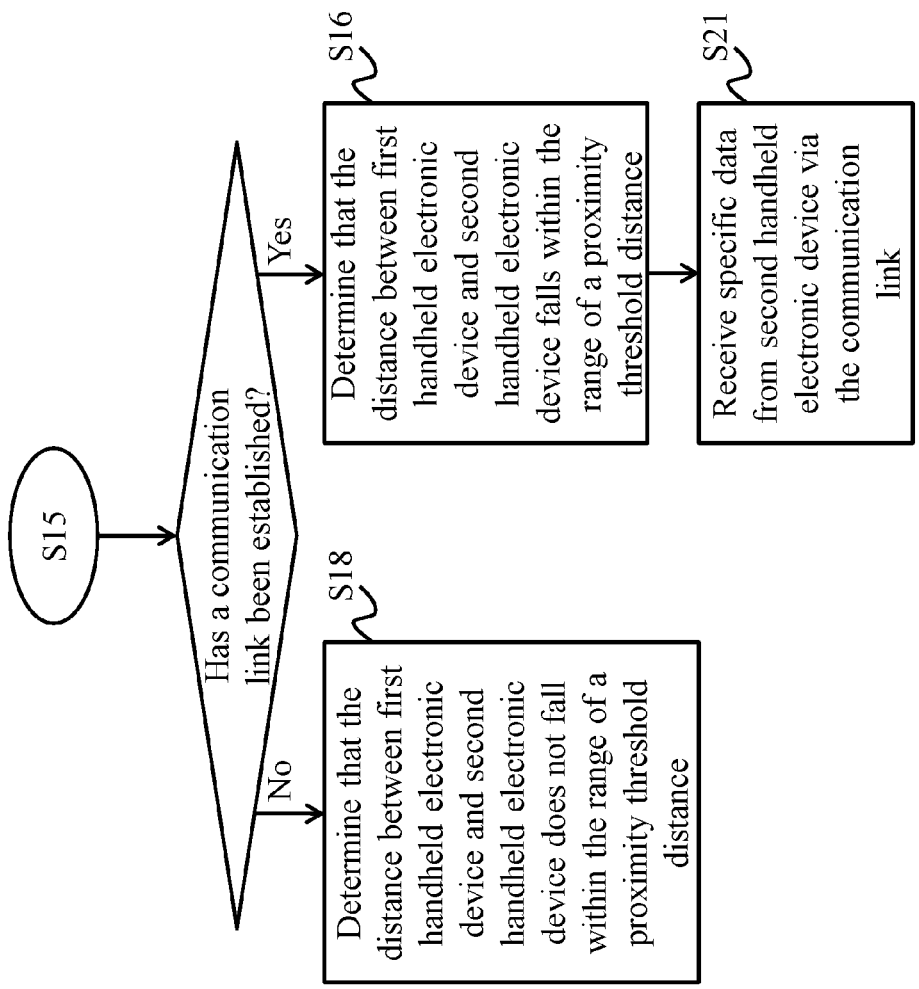
FIG. 6 is a partial flowchart of the data-transmitting method of the handheld electronic device according to the third embodiment of the present disclosure.

In some embodiments, as shown in FIG. 1 and FIG. 6, when the first motion data matches the second motion data, the processing circuit 130 uses the wireless module 170 to establish a communication link to the second handheld electronic device 20 according to the source device data (step S15) and confirms whether a communication link has been established. Upon the establishment of the communication link, the processing circuit 130 determines that the distance between the first handheld electronic device 10 and the second handheld electronic device 20 falls within the range of a proximity threshold distance (step S16) and receives the specific data from the second handheld electronic device 20 via the communication link (step S21). Conversely, when no communication link can be established, the processing circuit 130 determines that the distance between the first handheld electronic device 10 and the second handheld electronic device 20 does not fall within the range of a proximity threshold distance (step S18). The proximity threshold distance is the maximum distance defined between the wireless modules 170, 270 of the first handheld electronic device 10 and the second handheld electronic device 20 to still allow the first handheld electronic device 10 and the second handheld electronic device 20 to receive and send signals.

Figure 7:
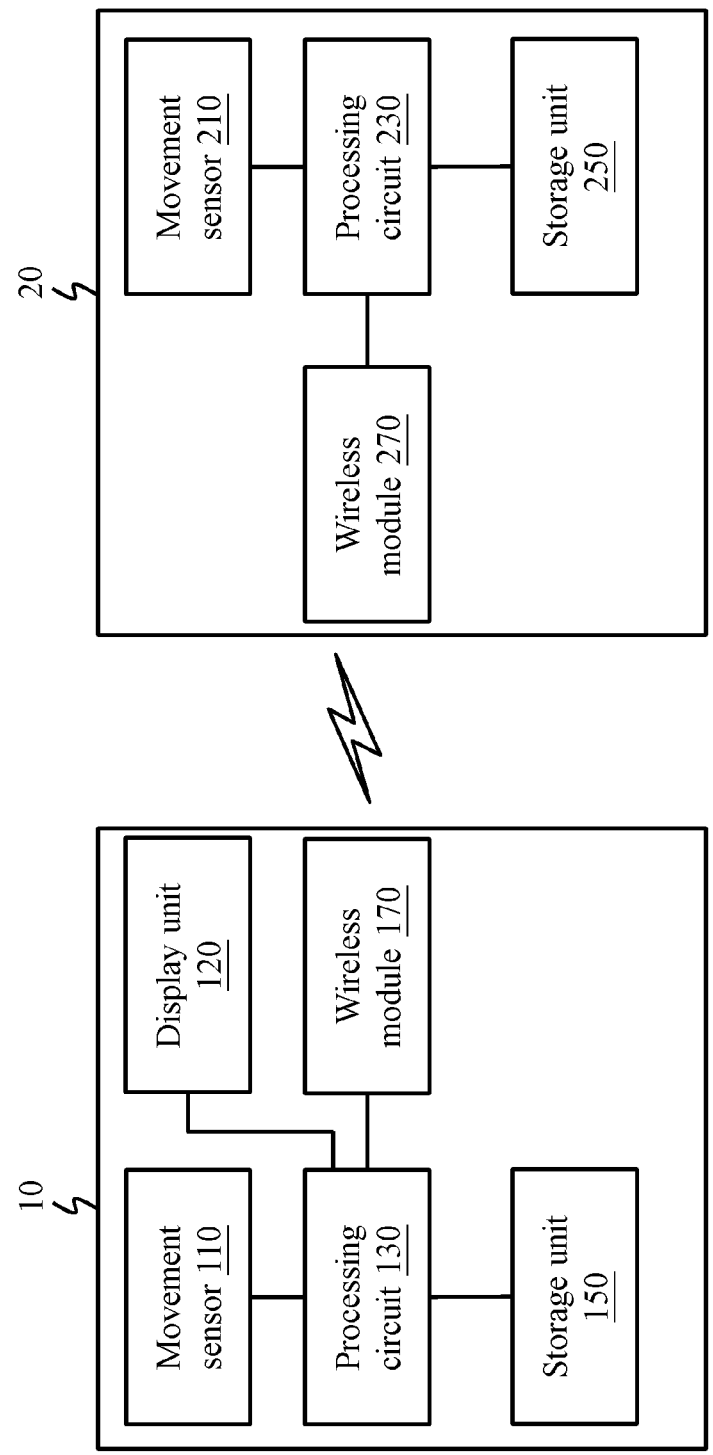
FIG. 7 is a block diagram of the handheld electronic device according to the second embodiment of the present disclosure.
Figure 8:
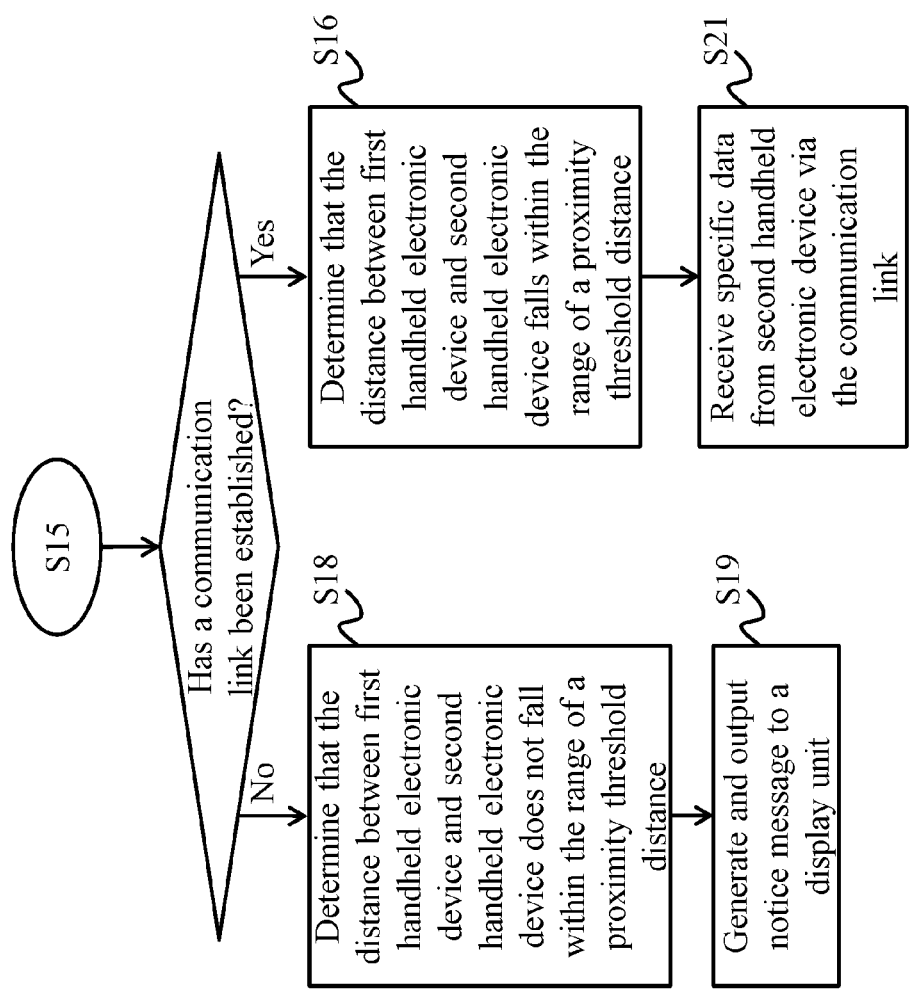
FIG. 8 is a partial flowchart of the data-transmitting method of the handheld electronic device according to the fourth embodiment of the present disclosure.

In some embodiments, as shown in FIG. 7 and FIG. 8, when no communication link can be established, the processing circuit 130 determines that the distance between the first handheld electronic device 10 and the second handheld electronic device 20 does not fall within the range of a proximity threshold distance (step S18), such that the processing circuit 130 generates and outputs a notice message to a display unit 120 (step S19). The notice message contains a hint (for example, message reference number and/or message text) about a failure to establish a communication link. Alternatively, the notice message contains a hint (for example, message reference number and/or message text) about a failure to establish a communication link and a cause thereof (for example, an overly long distance between the first handheld electronic device 10 and the second handheld electronic device 20).

Figure 9:
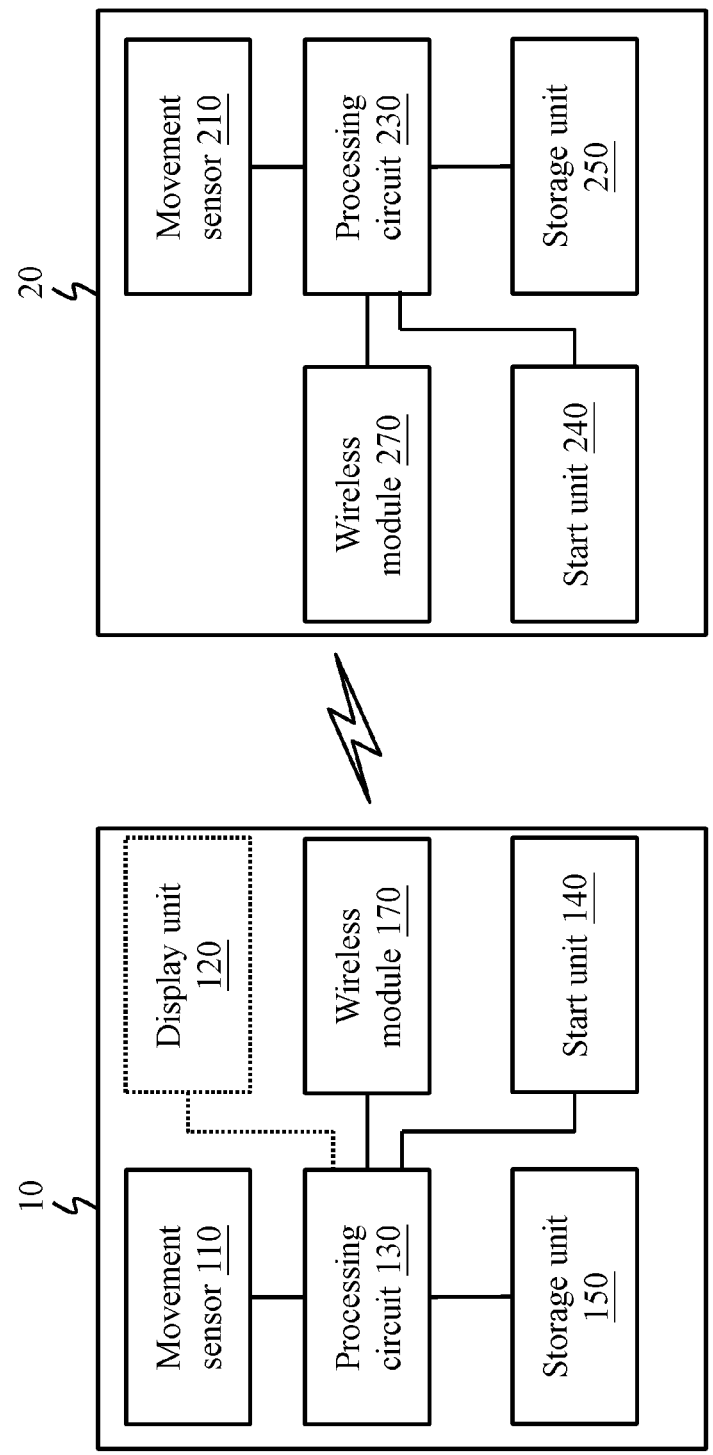
FIG. 9 is a block diagram of the handheld electronic device according to the third embodiment of the present disclosure.
Figure 10:
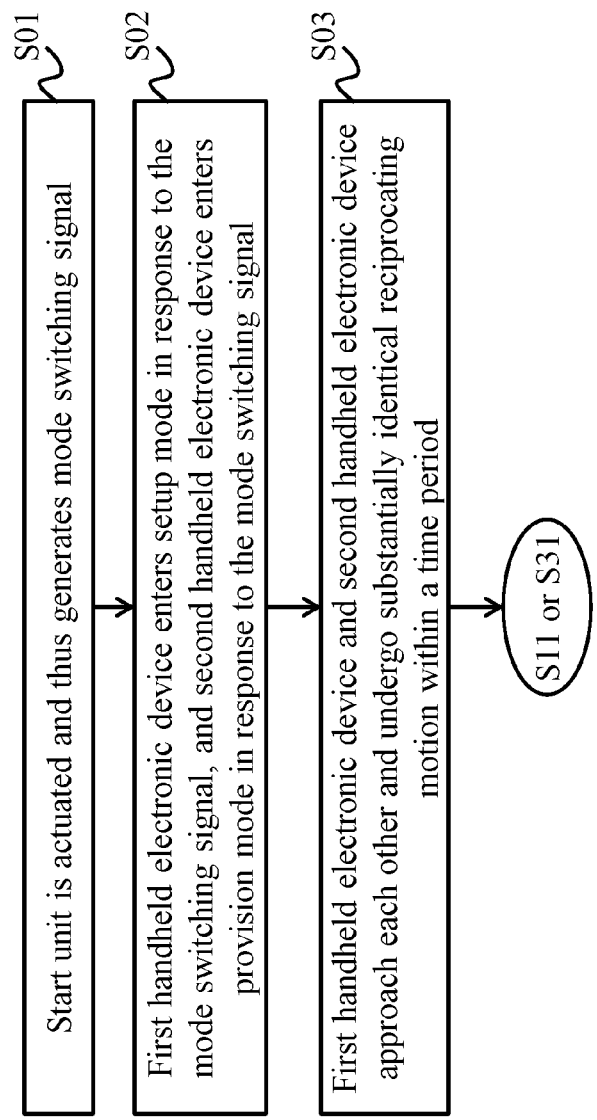
FIG. 10 is a flowchart of the data-transmitting method of the handheld electronic device according to the fifth embodiment of the present disclosure.

In some embodiments, as shown in FIG. 9 and FIG. 10, the first handheld electronic device 10 further comprises a start unit 140. The start unit 140 is coupled to the processing circuit 130. The start unit 140 is mounted on the casing of the first handheld electronic device 10. The start unit 140 provides an operating mode whereby the user 30 switches to the first handheld electronic device 10.

The second handheld electronic device 20 further comprises a start unit 240. The start unit 240 is coupled to the processing circuit 230. The start unit 240 is mounted on the casing of the second handheld electronic device 20. The start unit 240 provides an operating mode whereby the user 30 switches to the second handheld electronic device 20.

Regarding the first handheld electronic device 10, the start unit 140 is actuated and thus generates and sends a mode switching signal to the processing circuit 130 (step S01), such that the processing circuit 130 enters configuration mode in response to the mode switching signal (step S02). Regarding the second handheld electronic device 20, the start unit 240 is actuated and thus generates and sends a mode switching signal to the processing circuit 230 (step S01), such that the processing circuit 230 enters the configuration mode in response to the mode switching signal (step S02). In some embodiments, the actuation of the start unit 140 is achieved by pressing a specific key, pressing a specific number of specific keys simultaneously, or starting a specific app. The setup app is a wearable device app, for example, Android Wear OS App or Apple Watch App.

When both the first handheld electronic device 10 and the second handheld electronic device 20 are in the configuration mode, the first handheld electronic device 10 and the second handheld electronic device 20 are allowed to not only approach each other but also undergo substantially identical reciprocating motion within a time period (step S03), such that the first handheld electronic device 10 and the second handheld electronic device 20 generate the first motion data and the second motion data, respectively, because of their reciprocating motion (i.e., proceed to step S11).

Figure 11:
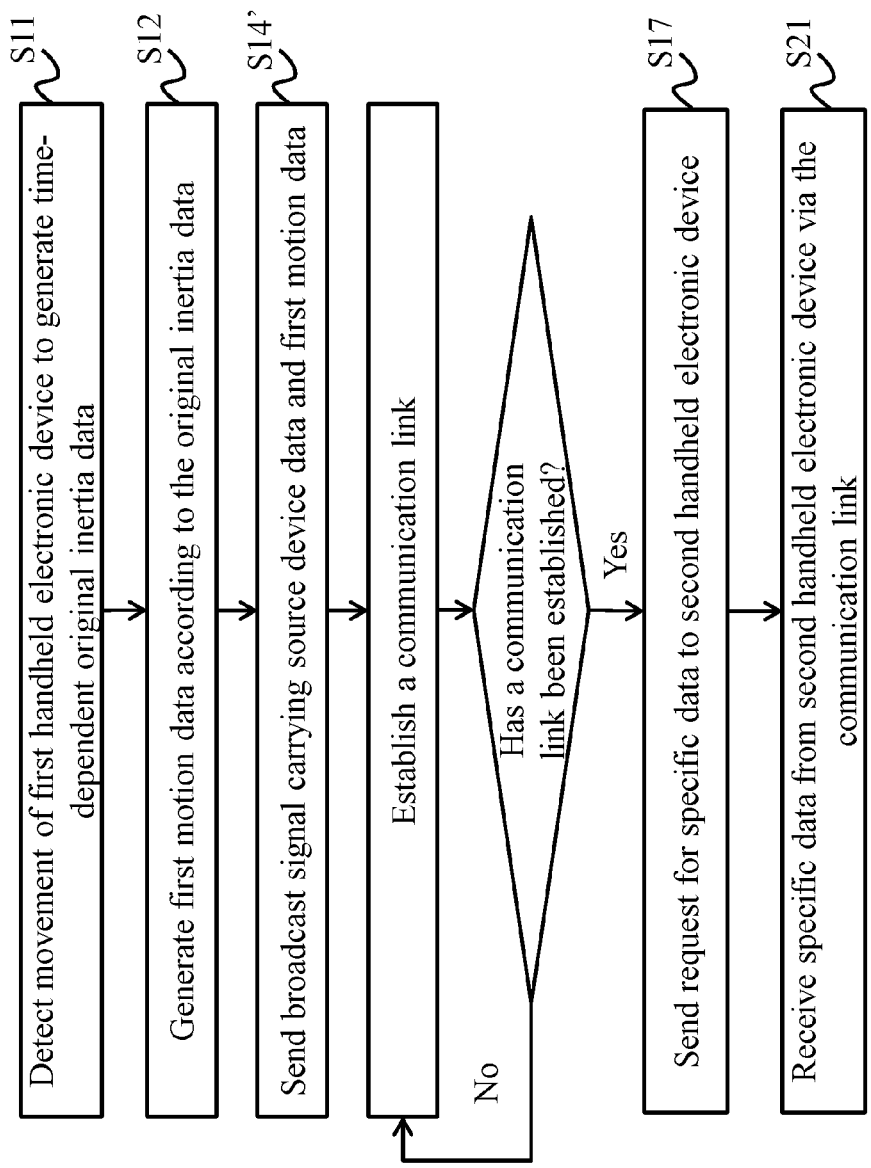
FIG. 11 and FIG. 12 are flowcharts of the data-transmitting method of the handheld electronic device according to the sixth embodiment of the present disclosure.
Figure 12:
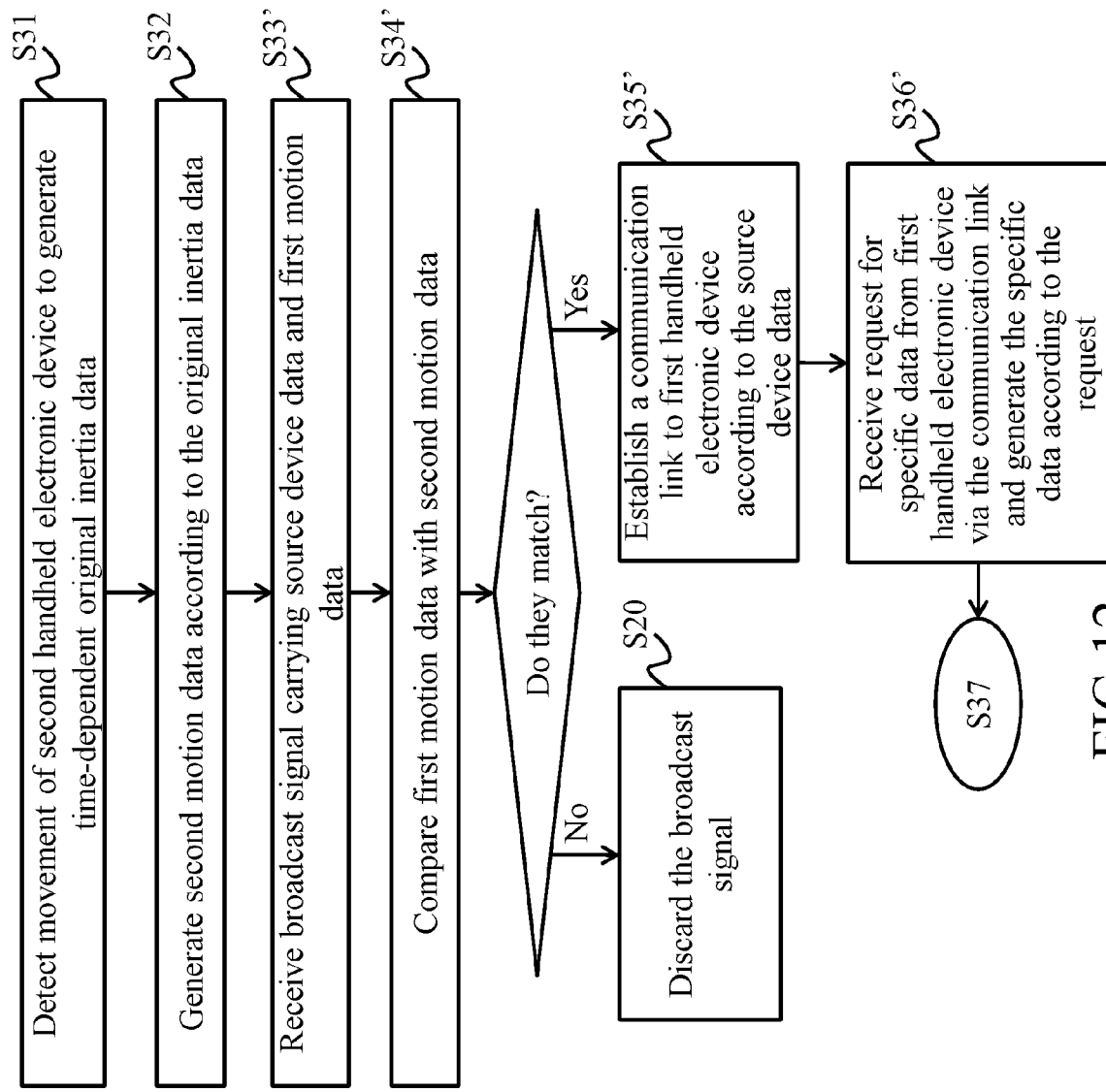

In some other embodiments, as shown in FIG. 1, FIG. 11 and FIG. 12, the processing circuit 130 uses the wireless module 170 to output (broadcast) a broadcast signal carrying the source device data and the first motion data (step S14').

When the wireless module 270 receives the broadcast signal (step S33'), the processing circuit 230 retrieves the first motion data from the broadcast signal and compares the first motion data with the second motion data (step S34') to confirm whether the two data match.

When the first motion data matches the second motion data, the processing circuit 230 uses the wireless module 270 to establish a communication link to the first handheld electronic device 10 according to the source device data (step S35').

Upon the establishment of the communication link, the processing circuit 130 sends a request for the specific data to the second handheld electronic device 20 via the communication link (step S17). Therefore, after the communication link has been established (i.e., after step S35'), the processing circuit 230 receives the request for the specific data from the first handheld electronic device 10 via the communication link and generates the specific data according to the request (step S36'), i.e., reads out the specific data from the storage device 250. Then, the processing circuit 230 sends the specific data thus read out to the first handheld electronic device 10 via the communication link (step S37). Therefore, the processing circuit 130 uses the wireless module 170 to receive the specific data via the communication link (i.e., step S21).

For instance, the user 30 is wearing a wearable device (i.e., the first handheld electronic device 10, for example, a smart watch), and information pertaining to the smart watch has already been stored in operation-oriented data (i.e., specific data).

To set up a peripheral device (i.e., the second handheld electronic device 20, for example, a camera), the user 30 starts a setup app of the smart watch to allow the smart watch to enter a setup mode (i.e., the configuration mode of the smart watch) and long presses a shortcut key of the camera to allow the camera to enter provision mode (i.e., the configuration mode of the camera).

Then, the user 30 grips the camera with the hand wearing the smart watch and performs physical movement, such that the camera and the smart watch generate similar inertia sensing data (i.e., original inertia data), allowing the camera to send continuously, by wireless broadcast, time sequence data (i.e., motion data) composed of the plurality of inertia sensing data generated continuously by the camera.

When the smart watch receives the time sequence data sent by the camera, a setup program in the smart watch compares the time sequence data generated by the smart watch with the received time sequence data. When the smart watch determines that the degree of similarity between two time sequence data reaches a threshold, the smart watch generates and outputs the configuration command and an operation-oriented configuration value to the camera according to operation-oriented data.

In a further example, the smart watch sends continuously, by wireless broadcast, time sequence data (i.e., motion data) composed of the plurality of inertia sensing data generated continuously by the smart watch. When the camera receives the time sequence data sent by the smart watch, the configuration process taking place in the camera involves comparing the time sequence data generated by the camera with the received time sequence data. When the camera determines that the degree of similarity between the two time sequence data reaches a threshold, the camera requests the smart watch to send an operation-oriented configuration value to the camera. After receiving the request, the smart watch generates and outputs the configuration command and an operation-oriented configuration value to the camera according to operation-oriented data.

Figure 13:
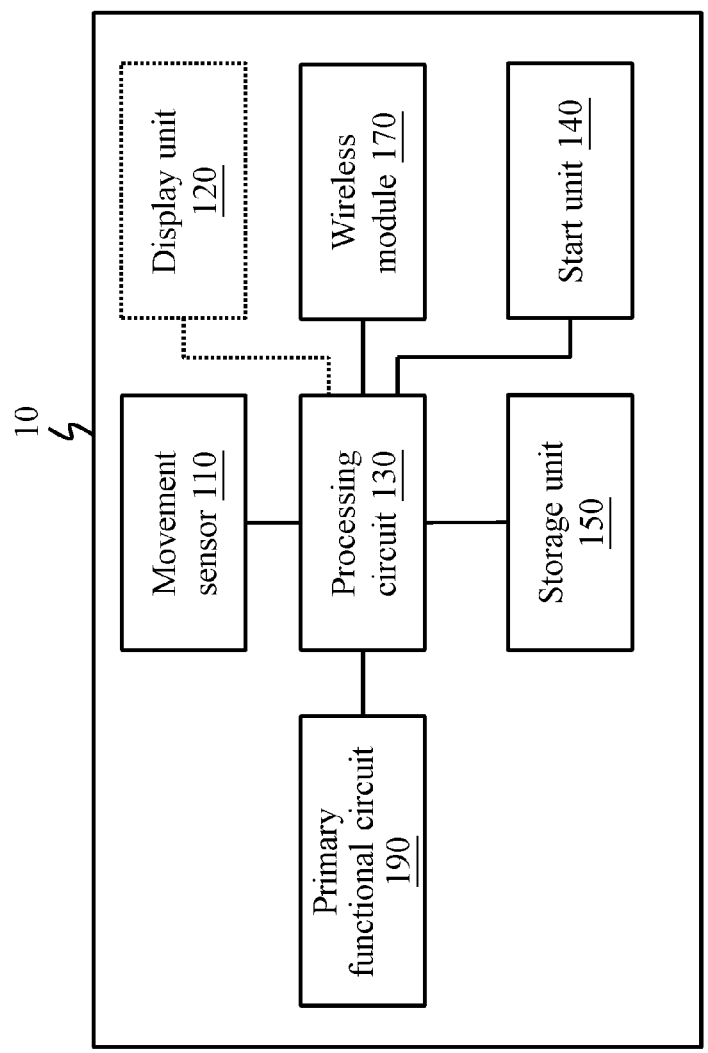
FIG. 13 is a block diagram of the first handheld electronic device in an example.
Figure 14:
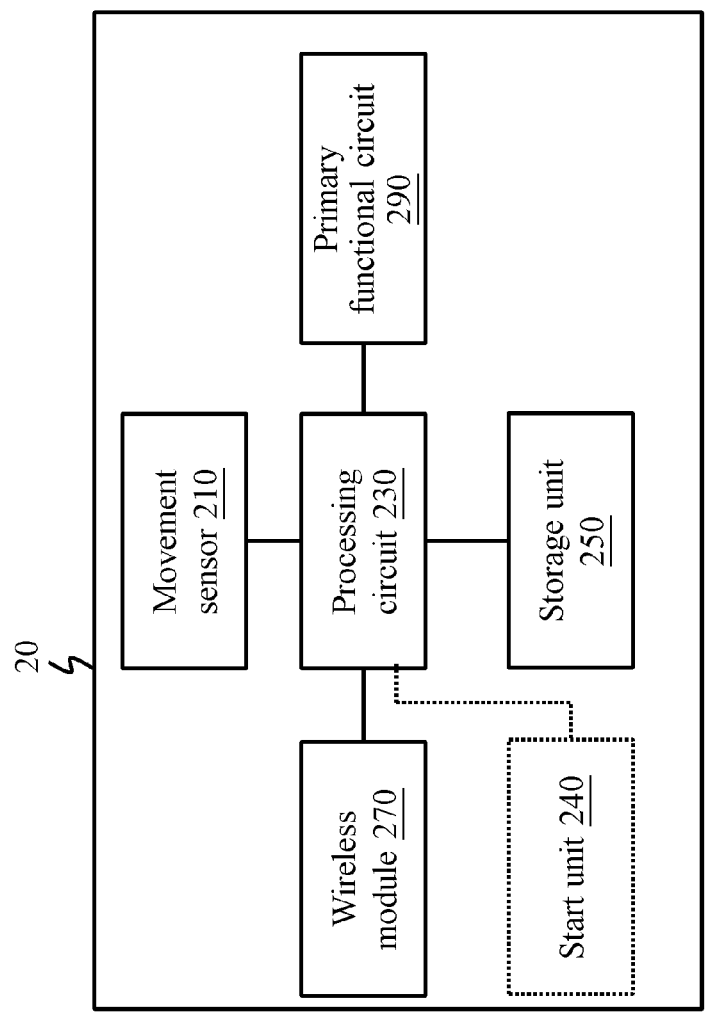
FIG. 14 is a block diagram of the second handheld electronic device in an example.

In some embodiments, as shown in FIG. 13 or FIG. 14, the first handheld electronic device 10 further comprises a primary functional circuit 190. The primary functional circuit 190 is coupled to the processing circuit 130 and controlled by the processing circuit 130. The primary functional circuit 190 is adapted to provide primary functions of the first handheld electronic device 10. Referring to FIG. 13, the second handheld electronic device 20 further comprises a primary functional circuit 290. The primary functional circuit 290 is coupled to the processing circuit 230 and controlled by the processing circuit 230. The primary functional circuit 290 is adapted to provide primary functions of the second handheld electronic device 20.

For instance, when the handheld electronic device (i.e., the first handheld electronic device 10 or the second handheld electronic device 20) is an information retrieving device, the handheld electronic device further has the primary functional circuit 190 (or 290) provided in the form of a video production unit. The video production unit is coupled to the processing circuit 130 (or 230) and controlled by the processing circuit 130 (or 230). In response to a start production command, the processing circuit 130 (or 230) controls the video production unit to start video production in order to retrieve an environment data. In response to an end production command, the processing circuit 130 (or 230) controls the video production unit to end video production in order to generate an environment data. The video production unit comprises a lens and an image processing unit. The image processing unit is an image signal processor (ISP). In some embodiments, the image processing unit and the processing circuit 130 (or 230) can be implemented by the same chip, but the present disclosure is not limited thereto.

In a further example, when the handheld electronic device (i.e., the first handheld electronic device 10 or the second handheld electronic device 20) is the smart watch, the handheld electronic device further has the primary functional circuit 190 (or 290) which is a time display unit. The time display unit is coupled to the processing circuit 130 (or 230) and controlled by the processing circuit 130 (or 230). The time display unit displays the current time.

Constituent elements indicated by dashed lines in FIG. 9, FIG. 13 and FIG. 14 are optional.

In some embodiments, each handheld electronic device (i.e., the first handheld electronic device 10 or the second handheld electronic device 20) is an information retrieving device, wearable device or 3C device. The information retrieving device is a camera, body worn camcorder, hidden voice recorder, wearable camera, mini-camera, or dash cam. The wearable device is a smart watch, smart bracelet, or Google Glass. The 3C device is a cellphone or tablet.

In some embodiments, each movement sensor 110/210 is a gyroscope, electronic compass, or accelerometer.

In some embodiments, each processing circuit 130/230 is provided in the form of one or more processing components. The processing components are each a microprocessor, microcontroller, digital signal processor, central processing unit, programmable logic controller, state machine, or any analog and/or digital device capable of operating signals according to the operation commands, but the present disclosure is not limited thereto. In an example, the processing components are microprocessing chips.

In some embodiments, each storage unit 150/250 is provided in the form of one or more storage components. The storage components are each a memory.

In some embodiments, the wireless modules 170, 270 are wireless transmission modules (for example, Bluetooth modules) which support near-field communication (for example, Bluetooth protocols). The Bluetooth protocols are, for example, Classic Bluetooth, Bluetooth High Speed, or Bluetooth Low Energy (BLE).

In some embodiments, the processing circuit 130 (or 230) of the first handheld electronic device 10 (or the second handheld electronic device 20) executes firmware or software algorithm stored in the storage unit 150 (or 250) to carry out the data-transmitting method of the handheld electronic device in any one of the aforesaid embodiments. The firmware or software algorithm is executed by means of a plurality of program codes. In some embodiments, the plurality of program codes are stored in a non-transitory storage device in order to be loaded to and executed by the first handheld electronic device 10 (or the second handheld electronic device 20). In some embodiments, a plurality of program codes is provided in the form of a program product and transmitted in a wired or wireless manner to the first handheld electronic device 10 (or the second handheld electronic device 20) in order to be stored in the storage unit 150 (or 250).

Therefore, the handheld electronic device, data-transmitting method thereof and non-transitory storage device in any one of the aforesaid embodiments allow the user 30 to perform authentication of two handheld electronic devices (i.e., the first handheld electronic device 10 and the second handheld electronic device 20) by means of physical motion (i.e., reciprocating motion), such that the two authenticated handheld electronic devices automatically receive and send the specific data.

What is claimed is:

1. A data-transmitting method of a handheld electronic device, comprising the steps of:
   detecting movement of a first handheld electronic device to generate a first motion data indicative of recorded movement of the first handheld electronic device within a period of time, wherein the step of detecting the movement of the first handheld electronic device to generate the first motion data comprises:
     detecting the movement of the first handheld electronic device to obtain a plurality of time-dependent original inertia data; and
     performing computation on the plurality of time-dependent original inertia data to generate the first motion data;
   receiving a broadcast signal carrying a source device data and a second motion data indicative of recorded movement of a second handheld electronic device within the period of time;
   comparing the first motion data with the second motion data to determine whether the first motion data matches the second motion data based upon a correspondence in the recorded movement of the first handheld electronic device and the recorded movement of the second handheld electronic device within the period of time;
   establishing a communication link to the second handheld electronic device according to the source device data when the first motion data matches the second motion data; and
   performing, via the communication link, at least one of:
     receiving a specific data from the second handheld electronic device or sending a request for the specific data to the second handheld electronic device.

2. The method of claim 1, further comprising the step of configuring the first handheld electronic device according to the specific data.

3. The method of claim 1, wherein the specific data comprises a configuration command and at least one configuration value, and the data-transmitting method further comprises the step of configuring the first handheld electronic device according to the at least one configuration value in response to the configuration command.

4. The method of claim 1, wherein the specific data comprises at least one of:
   an authentication parameter for performing permit authentication required to access the first handheld electronic device; and
   a configuration parameter for setting a configuration of the first handheld electronic device.

5. The method of claim 1, wherein the second motion data is generated when the second handheld electronic device detects movement of the second handheld electronic device.

6. The method of claim 1, further comprising the step of discarding the broadcast signal when the first motion data does not match the second motion data.

7. The method of claim 1, wherein the first motion data corresponds to inertia changes in the movement within the period of time.

8. The method of claim 1, wherein the plurality of time-dependent original inertia data is generated continuously within the period of time.

9. The method of claim 1, further comprising the step of determining, according to the communication link, that a distance between the first handheld electronic device and the second handheld electronic device falls within a range of a proximity threshold distance.

10. The method of claim 1, wherein both the first handheld electronic device and the second handheld electronic device are in a configuration mode.

11. A handheld electronic device, comprising:
- a movement sensor for detecting movement of the handheld electronic device to generate a plurality of time-dependent original inertia data;
- a processing circuit coupled to the movement sensor to perform computation on the plurality of time-dependent original inertia data to generate a first motion data indicative of recorded movement of the handheld electronic device within a period of time;
- a storage unit for storing the first motion data; and
- a wireless module for receiving a broadcast signal, wherein the broadcast signal carries a source device data and a second motion data indicative of recorded movement of another handheld electronic device within the period of time,
- wherein the processing circuit compares the first motion data with the second motion data to determine whether the first motion data matches the second motion data based upon a correspondence in the recorded movement of the handheld electronic device and the recorded movement of the another handheld electronic device within the period of time, such that the processing circuit uses the wireless module to establish a communication link to the another handheld electronic device according to the source device data when the first motion data matches the second motion data, so as to receive a specific data from the another handheld electronic device or send the specific data to the another handheld electronic device, via the communication link.

12. A non-transitory storage device, comprising a plurality of program codes, the plurality of program codes being loaded to a first handheld electronic device and executed thereon to enable the first handheld electronic device to:
- detect movement of the first handheld electronic device to generate a first motion data indicative of recorded movement of the first handheld electronic device within a period of time, wherein detecting the movement of the first handheld electronic device to generate the first motion data comprises:
  - detecting the movement of the first handheld electronic device to obtain a plurality of time-dependent original inertia data; and
  - performing computation on the plurality of time-dependent original inertia data to generate the first motion data;
- receive a broadcast signal carrying a source device data and a second motion data indicative of recorded movement of a second handheld electronic dev ice within the period of time;
- compare the first motion data with the second motion data to determine whether the first motion data matches the second motion data based upon a correspondence in the recorded movement of the first handheld electronic device and the recorded movement of the second handheld electronic device within the period of time;
- establish a communication link to the second handheld electronic device according to the source device data when the first motion data matches the second motion data; and
- receive a specific data from the second handheld electronic device or send a request for the specific data to the second handheld electronic device, via the communication link.

\* \* \* \* \*